R. KANIA.
BOILER.
APPLICATION FILED JAN. 25, 1919.

1,364,115.

Patented Jan. 4, 1921.

INVENTOR
Rudolf Kania.
BY
Frederick Myers
his ATTORNEY

UNITED STATES PATENT OFFICE.

RUDOLF KANIA, OF VINDEX, MARYLAND.

BOILER.

1,364,115.  Specification of Letters Patent.  Patented Jan. 4, 1921.

Application filed January 25, 1919. Serial No. 272,983.

*To all whom it may concern:*

Be it known that I, RUDOLF KANIA, a citizen of Russia, residing at Vindex, county of Garrett, and State of Maryland, have invented certain new and useful Improvements in Boilers, of which the following is a specification.

This invention relates to improvements in domestic boilers, and has as its principal object the provision of means whereby articles may be boiled in an inner receptacle so that the same are prevented from too close contact with the stove or other source of heating.

A further object is to provide means whereby the quantity of water in the outer receptacle can be ascertained by visual observation.

These and other like objects, such as economy in manufacture, durability, etc., are attained by the novel design and combination of parts hereinafter described, forming a material part of this disclosure, and in which—

Figure 1:
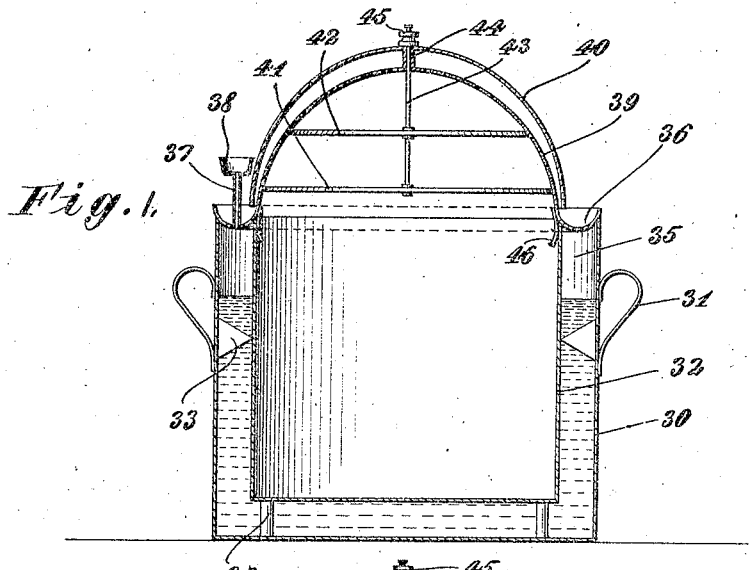
Figure 1 is a vertical sectional view showing the preferred form of boiler.
Figure 2:
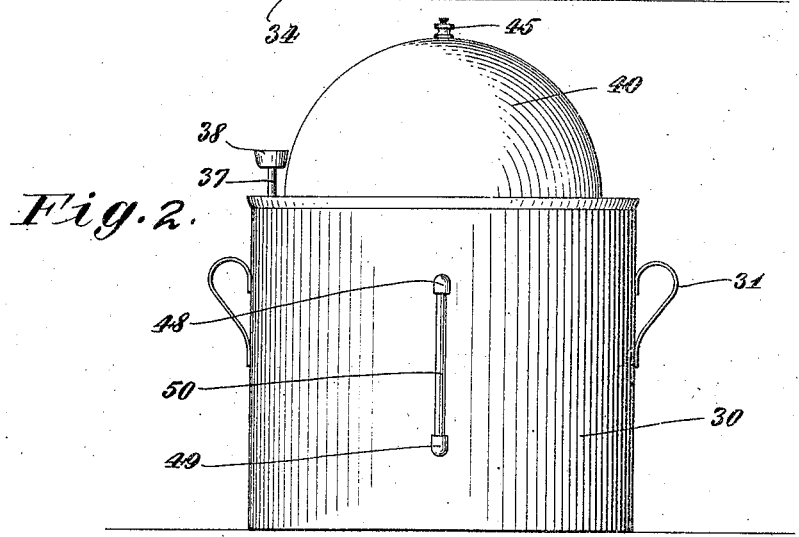
Fig. 2 is a side elevational view of the same.
Figure 3:
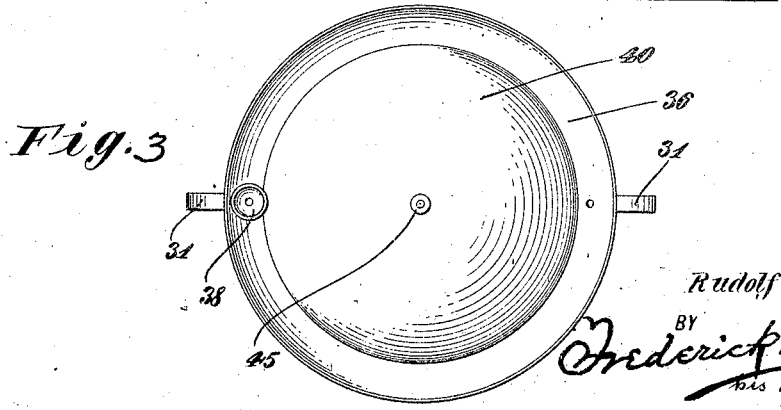
Fig. 3 is a top plan view thereof.

As shown in the drawing a cylindrical outer receptacle as indicated by the numeral 30, is provided with handles 31, and adapted to receive the inner receptacle 32, guided by triangular inner extensions 33 secured to the inner walls of the outer receptacle.

This inner receptacle rests upon legs or supports 34, in turn resting upon the bottom of the boiler as can best be seen in Fig. 1. A space 35 extends between the receptacle covered at its outer end by a trough 36 through which at one point extends a tube 37, having a projecting funnel 38, by means of which liquids may be entered within the space 35.

This trough 36 is formed with the inner cover 39, over which is an outer shell 40 and positioned within the inner cover 39 are a pair of partition plates 41 and 42 secured in position by a center rod 43, the same passing through a sleeve 44 at the extreme outer end and engaged with the nut 45 by means of which the plates are held in tight relation with the inner surface of the cover 39. In order to form a tight joint with the walls of the inner receptacle 32, are a pair of oppositely disposed clips 46 secured within the cover 39, the clips making contact with the walls of the inner vessel as best seen in Fig. 1.

Extending outward from the side of the vessel are tubular fittings 48 and 49, the same communicating with the space 35 and engaged with the fittings is a water gage tube 50 by means of which the quantity of water within the space may be readily seen.

Having thus described my invention what I claim as new and desire to obtain by Letters Patent, is—

The combination of an outer receptacle with an inner receptacle, triangular guides secured to the inner walls of the outer receptacle, legs supporting the inner receptacle, a trough covering the space between both receptacles at the top, a tube extending at one point through said trough, a funnel carried by said tube projecting into said space, an inner cover formed with said trough, and an outer shell over said inner cover, a pair of partition plates within the inner cover, a center rod for holding said plates in tight relation with the inner cover, and a pair of oppositely disposed clips within the inner cover for forming a tight joint, substantially as described.

In testimony whereof I have signed my name to this specification in the presence of two subscribing witnesses, this 18th day of January, 1919.

RUDOLF KANIA.

Witnesses:
 GEO. J. POOL,
 J. W. MARVILLE.